Figure 1:
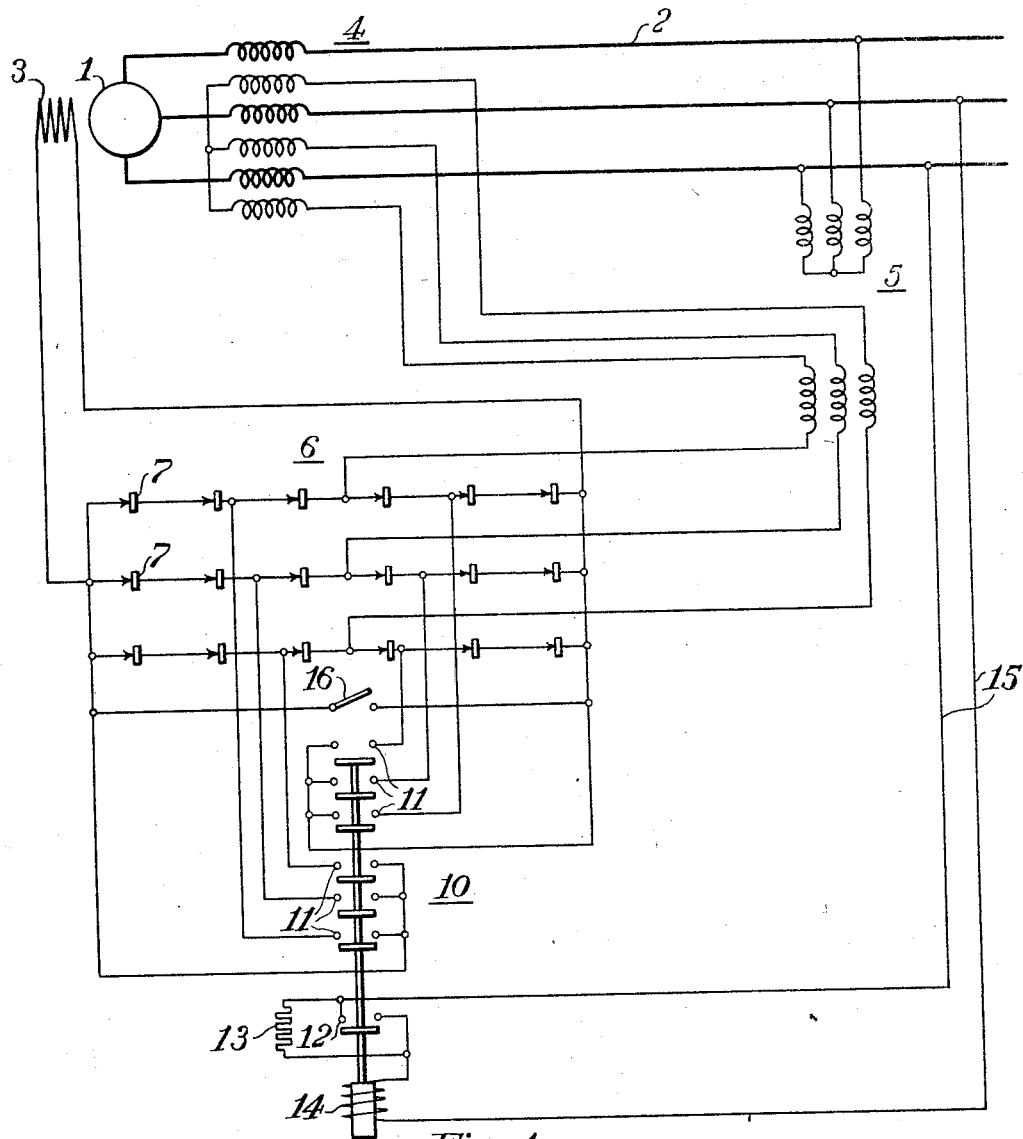

July 16, 1940.   E. FRIEDLÄNDER ET AL   2,208,416

EXCITATION OF SYNCHRONOUS GENERATORS

Filed July 13, 1938

WITNESSES:
Edward Michaels
F. P. Lyle

INVENTORS
Erich Friedländer and
Oskar Schmutz.
BY O. B. Buchanan
ATTORNEY

Patented July 16, 1940

2,208,416

UNITED STATES PATENT OFFICE 2,208,416

EXCITATION OF SYNCHRONOUS GENERATORS

Erich Friedländer, Berlin-Siemensstadt, and Oskar Schmutz, Berlin-Haselhorst, Germany, assignors to Westinghouse Electric & Manufacturing Company, East Pittsburgh, Pa., a corporation of Pennsylvania Application July 13, 1938, Serial No. 219,082
In Germany July 14, 1937

6 Claims. (Cl. 171—119)

The present invention relates to the excitation of alternating current generators and, more particularly, to an improved system for the self-excitation of a synchronous generator by means of rectifiers.

Systems of self-excitation of synchronous generators have been used in which the field winding is excited by direct current obtained from a rectifier which is connected to the generator. In this type of system, the current or voltage supplied to the rectifier preferably consists of two components, one of which is proportional to the generator voltage and the other to the load current. Thus, the excitation of the generator has a substantially constant component and a component which varies in accordance with the load so as to tend to maintain the generator voltage substantially constant.

The rectifiers used in such a system may be either of the dry type, such as copper oxide rectifiers, or of the gas or vapor-filled type. Dry type rectifiers have a very high resistance to low currents, and gas-filled rectifiers require a definite minimum voltage for ignition and also have a high resistance to low currents. With either type of rectifier, therefore, it is necessary to apply a fairly definite minimum voltage to the rectifier before an appreciable current will flow in the field winding of the generator. When the generator is started, however, its voltage is initially very low since it is produced by the residual magnetism of the field poles. If this initial voltage is less than the minimum voltage necessary to overcome the resistance of the rectifier, the generator will not excite itself and will fail to build up its voltage. This difficulty may be overcome by connecting a storage battery in parallel with the field winding during starting, but this is not satisfactory in many cases because of the necessary maintenance and supervision required for such batteries and is entirely unsuitable for isolated or unattended installations where self-excitation is especially desirable.

The object of the present invention is to provide a system for self-excitation of a synchronous generator by means of rectifiers which will insure a large enough flow of current in the field winding while the generator is being started to cause it to build up its voltage.

A more specific object is to provide a system of self-excitation which will insure that the voltage supplied to the rectifier during the starting period will be greater than the minimum voltage necessary to initiate an appreciable flow of current through the rectifier.

These objects are attained by providing a system in which the relation between the voltage initially supplied to the rectifier by the generator and the minimum voltage necessary to initiate a substantial flow of current through the rectifier may be altered while the generator is being started, so as to insure that the ratio of these two voltages will always be greater than one. This may be done in various ways. For example, if dry type rectifiers are used, with a plurality of individual rectifier units connected in series, certain of these units may be short circuited during the starting period so as to reduce the resistance of the rectifier circuit and thus lower the necessary minimum voltage. Instead of reducing the resistance of the rectifier and, therefore, the voltage necessary to cause a substantial current flow therethrough, the same result may be obtained by increasing the voltage applied to the rectifier. This may be conveniently done by using a transformer having two or more taps in its secondary winding so that relatively higher voltage may be applied to the rectifier during the starting period.

Figure 2:
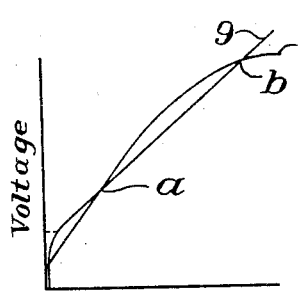
Figure 3:
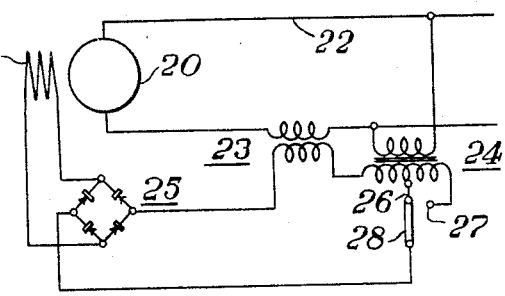

The invention will be more fully understood from the following detailed description taken in connection with the accompanying drawing, in which Figure 1 is a diagram showing a system for self-excitation of a synchronous generator;

Fig. 2 is a graph showing certain relationships between current and voltage in this system, and Fig. 3 is a diagram showing another embodiment of the invention.

One embodiment of the invention is shown in Fig. 1 as applied to a 3-phase synchronous generator 1, connected to supply a 3-phase line 2 and having a direct current field winding 3. A 3-phase transformer 4 has its primary windings connected in series with the generator leads and a second 3-phase transformer 5 is connected across the generator voltage. Single phase transformers connected as shown could, of course, also be used. The secondary windings of the transformers 4 and 5 are connected in series to a rectifier circuit 6 which supplies direct current to the field winding 3. The rectifier circuit comprises a plurality of individual rectifier units 7 of the dry type, such as copper oxide rectifiers, which are connected together in any suitable 3-phase connection, with a plurality of rectifier units in each branch of the circuit. It will be seen that the voltage supplied to the rectifier circuit 6 comprises two components, one of which is proportional to the generator voltage and the other to the load current so that the excitation varies with the load to maintain the generator voltage substantially constant.

The curves of Fig. 2 show the relation between the generator voltage and the exciting current in this system. The curve 8 in this figure shows the generator voltage as a function of the exciting current, while the curve 9 shows the current supplied by the rectifier as a function of the voltage applied to it. It will be seen from these curves that when the generator is started with zero exciting current, it will have a small initial voltage, which is produced by the residual magnetism of its field poles. It will also be seen that this voltage, when applied to the rectifier, is too low to produce an appreciable flow of current through it, and that in the particular case shown, the curve 8 lies below the curve 9 for a substantial distance so that the generator will not excite itself until its voltage has reached the value corresponding to the point $a$. Above this point, the curve 8 lies above the curve 9 so that the system will be self-exciting for all values of generator voltage up to the point $b$. It will be apparent, therefore, that a system having the characteristics shown in Fig. 2 cannot be made satisfactorily self-exciting merely by connecting a rectifier to the generator. According to the present invention, however, this difficulty may be overcome by changing the relation between the initial voltage of the generator and the minimum voltage necessary to produce a substantial flow of current in the rectifier. This may be done either by relatively increasing the voltage initially applied to the rectifier or by decreasing the minimum voltage necessary for initiating current flow through the rectifier.

Fig. 1 shows a preferred means of decreasing the required minimum voltage for initiating current flow through the rectifier. Dry type rectifiers, as stated above, have a very high resistance for low currents and this requires a relatively high voltage in order to produce a substantial flow of current. The value of this voltage may be reduced by reducing the resistance of the rectifier and this may be conveniently done, when the rectifier circuit consists of a plurality of units, by short circuiting some of these units during the initial period when the voltage applied to the rectifier circuit is relatively low. This can safely be done because rectifiers of this type can be subjected to overvoltage for short periods without damage and the exciting current supplied by the rectifier when the generator is being started at no load, is only from ⅓ to ½ of its full load value.

This short circuiting of the rectifier may be performed manually, if desired, but it is preferably carried out automatically and, as shown in Fig. 1, this may be done by providing a switch or contactor 10 which is normally urged to closed position by a spring or by gravity or other means. The contacts 11 of this switch are connected, as shown on the drawing, to short circuit two of the three rectifier units in each branch of the rectifier circuit and the contacts 12 short circuit a resistor 13 which is connected in series with the operating coil 14 of the contactor. The coil 14 is connected by leads 15 across one phase of the line 2. A short circuiting switch 16 is provided to short circuit the field winding 3 when the generator is stopped.

In starting the generator, the switch 16 is first opened, and the generator 1 is then started from rest by its prime mover. Since the generator voltage is very low at this time, the contactor 10 will remain closed, short circuiting two of the rectifier units 7 in each branch of the circuit 6. The effect of this is to lower the resistance of the rectifier circuit, so that the voltage supplied to it from the generator will cause a sufficient flow of current in the field winding to cause the voltage to build up. When the generator voltage has increased to a sufficiently high value, corresponding to the point $a$ of Fig. 2, the coil 14 will open the contactor 10, thus connecting all of the rectifier units in the circuit. The opening of the contacts 12 connects the resistor 13 in series with the coil 14 in order to limit the current in the coil as the generator voltage increases. Suitable means may be provided, if necessary, to prevent reclosing of the contactor 10 when the resistor 13 is connected in the circuit of the operating coil.

The invention may also be carried out by increasing the voltage supplied to the rectifier instead of decreasing its resistance. This embodiment of the invention is shown in Fig. 3 as applied to a single phase generator 20 having a direct current field winding 21 and connected to supply a single phase line 22. A transformer 23 is connected in the line 22 and another transformer 24 is connected across the generator voltage. The secondary windings of these transformers are connected in series to a rectifier circuit 25 which is shown as comprising a plurality of rectifier units of the dry type, although it is to be understood that other types, such as gas-filled rectifiers, could equally well be used. In order to provide a high enough voltage on the rectifier 25 when the generator is being started, the secondary winding of the transformer 24 is provided with two taps 26 and 27 which may be connected to the rectifier by a tap-changing switch 28.

In starting the generator, the switch 28 is put on the tap 27 so that a relatively high voltage is supplied to the rectifier 25 during the starting period, to insure a sufficient flow of current in the field winding 21 for proper self-excitation. When the generator voltage has reached a value corresponding to the point $a$ of Fig. 2, the switch 28 is changed to the tap 26 giving a 1:1 transformer ratio so that the voltage on the rectifier will have the correct value when the generator reaches its full rated voltage. The switch 28 may be operated either manually or automatically in response to the generator voltage.

It will be seen that a system of self-excitation by means of rectifiers has been provided, therefore, which makes it possible to insure building up of the generator voltage even though its initial voltage when first started is very low and that this is done by changing the relation between the voltage supplied to the rectifier and the minimum voltage necessary to initiate current flow through it during the starting period. This change may be effected either by decreasing the minimum voltage of the rectifier, as in Fig. 1, which corresponds to lowering the curve 9 of Fig. 2, or by relatively increasing the voltage supplied to the rectifier, as in Fig. 3, which corresponds to raising the curve 8. In either embodiment of the invention, this change may be carried out either manually, or automatically, in response to the generator voltage. Either dry type rectifiers or gas or vapor filled rectifiers may be used, since both types have high resistance for low currents and require a fairly definite minimum voltage to initiate a substantial flow of current through them, and either embodiment of the invention may be applied to either single phase or polyphase generators.

Although certain specific embodiments of the invention have been illustrated and described, it should be understood that it is not limited to the particular arrangement shown but, in its broadest aspect, it includes all equivalent embodiments and modifications which come within the scope of the appended claims.

We claim as our invention:

1. An excitation system for an alternating current generator having a direct current field winding, comprising rectifier means connected to the field winding to supply direct current thereto, said rectifier means having a minimum voltage below which insufficient current for self-excitation will flow in the field winding, means energized from the generator to supply an alternating voltage to the rectifier means, and means operative while the generator is being started to reduce the value of said minimum voltage.

2. A system for self-excitation of an alternating current generator having a direct current field winding, comprising rectifier means connected to the field winding to supply direct current thereto, means energized from the generator to supply an alternating voltage to the rectifier means, and means operative while the generator is being started to reduce the voltage necessary to initiate current flow through the rectifier means.

3. A system for self-excitation of an alternating current generator having a direct current field winding, comprising rectifier means connected to the field winding to supply direct current thereto, said rectifier means having a relatively high resistance for low currents, means energized from the generator for supplying an alternating voltage to the rectifier means, and means operative while the generator is being started to reduce the resistance of the rectifier means.

4. A system for self-excitation of an alternating current generator having a direct current field winding, comprising rectifier means connected to the field winding to supply direct current thereto, said rectifier means having a plurality of individual rectifier units connected in series, means energized from the generator for supplying an alternating voltage to the rectifier means and means operative while the generator is being started to short-circuit certain of said rectifier units.

5. A system for self-excitation of an alternating current generator having a direct current field winding, comprising rectifier means connected to the field winding to supply direct current thereto, said rectifier means having a plurality of individual rectifier units connected in series, means energized from the generator for supplying an alternating voltage to the rectifier means, and means responsive to the generator voltage for short-circuiting certain of said rectifier units when the generator voltage is lower than a predetermined value.

6. A system for self-excitation of an alternating current generator having a direct current field winding, comprising rectifier means connected to the field winding to supply direct current thereto, said rectifier means having a plurality of individual rectifier units connected in series, means energized from the generator for supplying an alternating voltage to the rectifier means, switch means for short-circuiting certain of said rectifier units, and means responsive to the generator voltage for opening said switch when the generator voltage exceeds a predetermined value.

ERICH FRIEDLÄNDER.
OSKAR SCHMUTZ.